Figure 4:
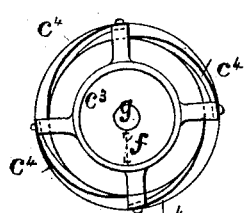

(No Model.) 2 Sheets—Sheet 1.

A. PERRY, A. W. GILLMAN & S. SPENCER.
PROCESS OF AND APPARATUS FOR PREPARING GRAIN OR CEREALS TO BE USED IN BREWING AND DISTILLING.

No. 340,677. Patented Apr. 27, 1886.

(No Model.) 2 Sheets—Sheet 2.
A. PERRY, A. W. GILLMAN & S. SPENCER.
PROCESS OF AND APPARATUS FOR PREPARING GRAIN OR CEREALS
TO BE USED IN BREWING AND DISTILLING.

No. 340,677. Patented Apr. 27, 1886.

UNITED STATES PATENT OFFICE.

ALEXANDER PERRY, OF FAIRFIELD ROAD BOW, COUNTY OF MIDDLESEX, AND ALEXANDER W. GILLMAN AND SAMUEL SPENCER, OF THE CASTLE BREWERY, ST. GEORGE'S ROAD, SOUTHWARK, COUNTY OF SURREY, ENGLAND.

PROCESS OF AND APPARATUS FOR PREPARING GRAIN OR CEREALS TO BE USED IN BREWING AND DISTILLING.

SPECIFICATION forming part of Letters Patent No. 340,677, dated April 27, 1886.

Application filed December 7, 1885. Serial No. 184,974. (No model.)

*To all whom it may concern:*

Be it known that we, ALEXANDER PERRY, of Fairfield Road Bow, in the county of Middlesex, England, engineer, and ALEXANDER WILLIAM GILLMAN and SAMUEL SPENCER, both of the Castle Brewery, St. George's Road, Southwark, in the county of Surrey, England, consulting practical brewers and analytical chemists, have invented an Improved Method of and Apparatus for Preparing Grain or Cereals to be used in Brewing, Distilling, and Vinegar-Making, and in the Preparation of Food and Confectionery, of which the following is a specification.

This invention relates to an improved process of and apparatus for preparing grain or cereals to be used in brewing, distilling, and vinegar-making, and in the preparation of food and confectionery, the said operation being in lieu of the germinating operation in the process of malting; and it consists in first washing in hot or cold water or boiling the grain or cereal under treatment, and then roasting or drying the same by subjecting it to the action of a sand bath, the said roasting or drying operation being performed in an apparatus constructed in the following manner:

The apparatus consists of a cylindrical or other shell heated by a furnace, and traversed longitudinally by an inner cylinder of wire-cloth, communicating at the ends with supply and discharge chambers for the grain and containing an Archimedean-screw conveyer, preferably also made of wire-cloth, by which the grain is carried through the cloth cylinder, which latter is also provided with pockets or lifters to raise the sand and allow it to fall through the body of grain under treatment. This inner cylinder is embedded in sand, which is heated by the furnace, and has access to the interior through the meshes of the cloth, so as to mingle with the grain or cereal in its passage through the cloth cylinder, whereby uniformity of roasting or drying to any desired degree is insured, the mixed grain and sand being subsequently separated by sifting; and in order that the said invention may be more clearly understood and readily carried into effect, we will proceed, aided by the accompanying drawings, more fully to describe the same.

Figure 3:
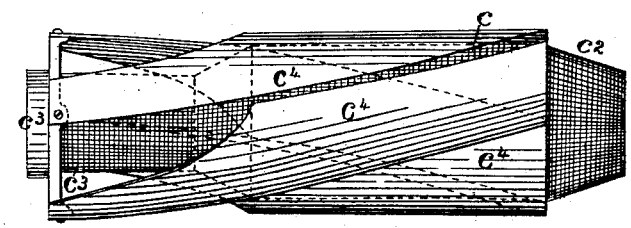
Figure 1:
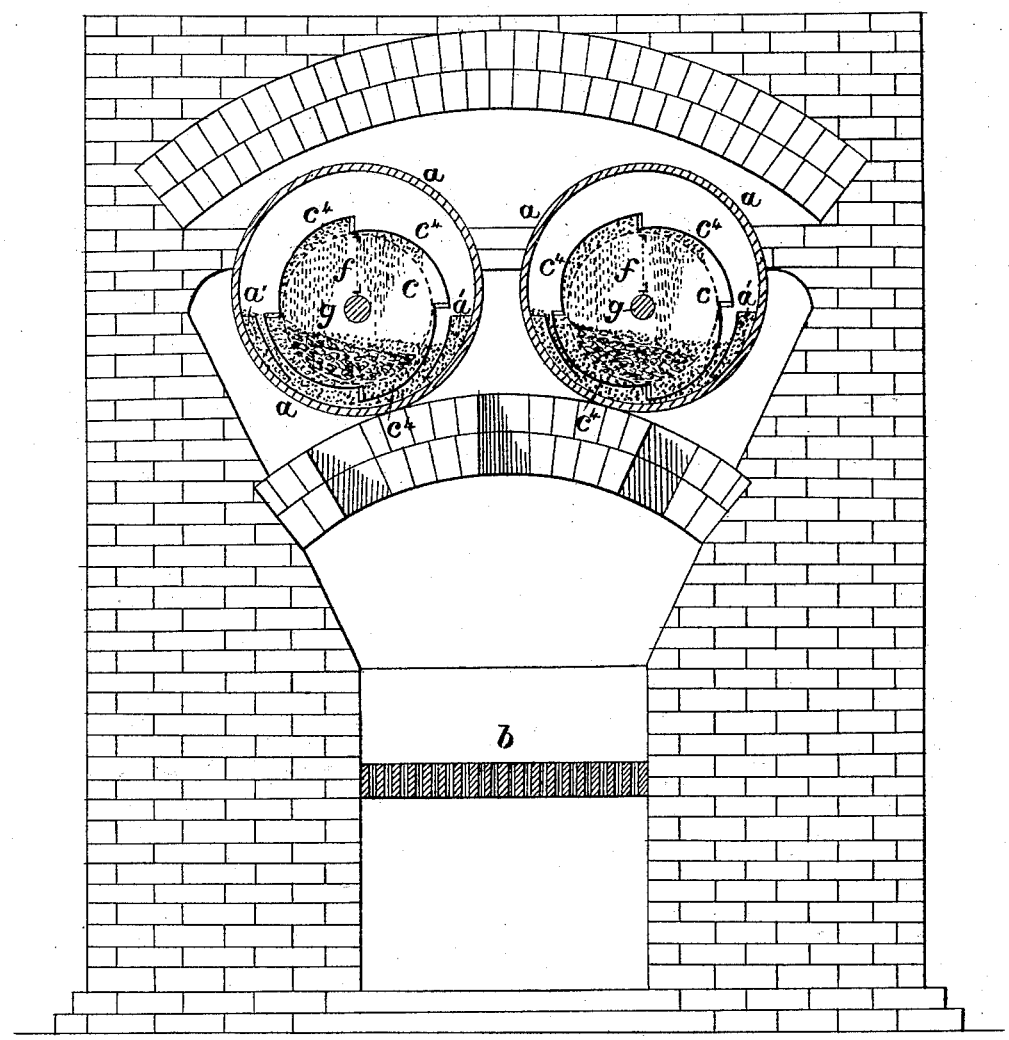
Figure 2:
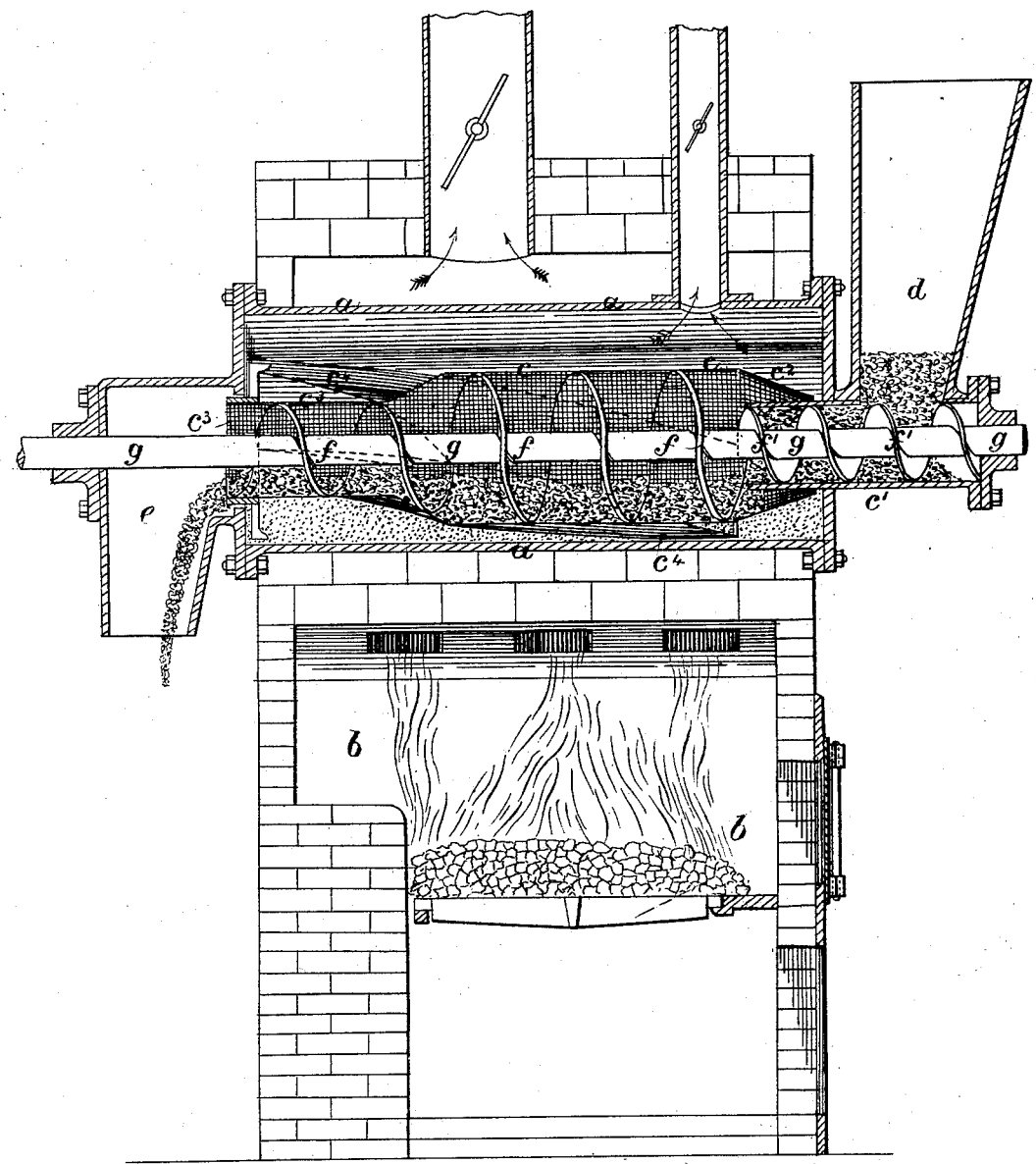

In the drawings, Figure 1 is a transverse section, and Fig. 2 is a longitudinal section, of apparatus employed in carrying the invention into practice. Fig. 3 is a side view, and Fig. 4 is an end view, of the wire-gauze cylinder and parts carried thereby.

The invention consists in first washing in hot or cold water or boiling the grain or cereals, and in then roasting or drying the same by subjecting it to the action of a sand bath, which is caused to pass through and mingle with the grain under treatment, so as to apply heat quickly and regularly thereto, whereby the grain or cereal may be swollen and burst, thereby bursting and opening up the starch-granules, and rendering it suitable for employment in lieu of a portion of germinated malt in brewing, distilling, and vinegar-making, and in the preparation of food and confectionery. The apparatus employed in effecting this operation consists of a cylindrical or other shell, $a$, preferably of cast-iron, heated by a furnace, $b$, and traversed longitudinally by an inner cylinder, $c$, of wire-cloth, communicating at one end with a supply chamber or hopper, $d$, and at the other with a discharge chamber or passage, $e$, for the grain. The cylinder $c$ contains a screw-conveyer, $f$, preferably also made of wire-cloth, (it might, however, be made of perforated or solid sheet metal,) by which the grain is conveyed through the cylinder $c$. The cylinder $c$ and the conveyer $f$ are fixed on the shaft $g$ and revolve therewith. The chamber or hopper $d$ communicates with a fixed cylinder, $c'$, which enters a short distance into the contracted end $c^2$ of the cylinder $c$, and around which the latter revolves. This fixed cylinder $c'$ is provided with a feeding-screw, $f'$, also fixed to the shaft $g$ and serving to supply the grain or cereal to the cylinder $c$. The discharged end $c^3$ of the cylinder $c$, and the corresponding portion of the screw-conveyer $f$, are formed of smaller diameter than the main portions of the cylinder and conveyer for the purpose of separating to some extent the sand from the grain, and the exterior of the cylinder $c$ is provided with pockets or lifters $c^4$, preferably fixed in a slightly curved or screw-like direction around the same and reduced in width toward the delivery end of the cylinder $c$, while they are also fixed in a reverse direction to that of the screw-conveyer $f$, in order to keep the sand as far as possible from heaping up toward the discharge end of the cylinder $c$, and thereby prevent all but a small portion thereof passing off with the grain through the discharge-passage $e$.

The furnace, setting, and flues may be constructed as shown in the drawings, or in other convenient and suitable manner.

The action of the apparatus is as follows: The cylindrical or other shell $a$ is supplied with sand to about the depth indicated in the drawings, and this sand being in direct contact with the shell $a$ becomes highly heated. The shaft $g$ is rotated by any suitable means at the required speed, and in its revolution it carries with it the screws $f f'$, wire-cloth cylinder $c$, and pockets or lifters $c^4$. Grain from the hopper $d$ is thus fed by the screw $f'$ into the cylinder $c$, along which it is carried by the screw-conveyer $f$ to the discharge-passage $e$. In the revolution of the cylinder $c$ the pockets or lifters $c^4$ lift up the heated sand and cause it to drop through the wire cloth of the cylinder $c$, and through that of the screw-conveyer $f$ onto and among the grain under treatment, whereby the said grain becomes quickly and uniformly heated until it has acquired the desired degree of roasting or drying, which may be regulated by varying the speed of the shaft $g$, and consequently the length of time occupied by the grain or cereal in passing through the cylinder $c$, and during which it is submitted to heat therein.

Any sand thrown over by the pockets or lifters $c^4$ against the shell $a$ will pass into the side pockets, $a'$, and be thereby kept for some little time against the inner face of the shell $a$, after which it will pass off at the bottom of such pockets $a'$ and mingle with the general bulk of sand in the shell $a$. The shaft $g$ may, if desired, be formed hollow, to enable a thermometer to be inserted, in order to ascertain the temperature within the cylinder $c$.

By submitting the grain to the preliminary operation of washing or boiling, and then roasting or drying the same by the process and apparatus herein described, we are enabled to purify the grain and to produce roasted or dried grain which is free from the bitter flavor it ordinarily possesses when roasted or dried without being submitted to a preliminary washing or boiling process.

We are aware that it has been proposed to prepare grain for market or other purposes by first subjecting it to the action of hot water and then to superheated steam, and do not claim, broadly, as our invention the process of treating grain which consists in first soaking in hot water and then drying.

Having now particularly described and ascertained the nature of our said invention and in what manner the same is to be performed, we declare that what we claim is—

1. The improved method of preparing grain or cereals, substantially as herein described, which consists in first subjecting it to the action of hot water and then drying it by commingling with a heated granular material, as set forth.

2. The method of roasting or drying grain or cereals by submitting the same to a bath of heated sand, substantially as herein shown and described, and for the purposes stated.

3. The combination, in apparatus for roasting or drying grain, of a shell, $a$, supplied with sand, side pockets, $a'$, furnace $b$, wire-cloth cylinder $c$ $c^2$, feeding-cylinder $c'$, pockets or lifters $c^4$, hopper $d$, feed screw $f'$, screw-conveyer $f$, shaft $g$, and discharge-aperture $e$, substantially as herein shown and described, and for the purpose stated.

A. PERRY.
ALEX. W. GILLMAN.
SAML. SPENCER.

Witnesses:
ERNEST S. SPENCER,
   *Castle Brewery, London, S. E.*
C. M. WHITE,
   *23 Southampton Building, London.*